(12) United States Patent
Danno et al.

(10) Patent No.: US 11,251,509 B2
(45) Date of Patent: Feb. 15, 2022

(54) ENERGY STORAGE DEVICE

(71) Applicant: GS Yuasa International Ltd., Kyoto (JP)

(72) Inventors: Hiroyuki Danno, Kyoto (JP); Jun Nakanishi, Ritto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 91 days.

(21) Appl. No.: 16/629,500

(22) PCT Filed: Jul. 13, 2018

(86) PCT No.: PCT/JP2018/026493
§ 371 (c)(1),
(2) Date: Jan. 8, 2020

(87) PCT Pub. No.: WO2019/013326
PCT Pub. Date: Jan. 17, 2019

(65) Prior Publication Data
US 2021/0135324 A1    May 6, 2021

(30) Foreign Application Priority Data

Jul. 14, 2017  (JP) .............................. JP2017-138403

(51) Int. Cl.
*H01M 50/00* (2021.01)
*H01M 50/636* (2021.01)

(52) U.S. Cl.
CPC ................................ *H01M 50/636* (2021.01)

(58) Field of Classification Search
CPC ........ H01G 11/58; H01G 11/78; H01G 11/80; Y02E 60/10; H01M 50/636
See application file for complete search history.

(56) References Cited

U.S. PATENT DOCUMENTS 6,146,784 A * 11/2000 Hakarine ............ H01M 50/308
429/82
6,455,193 B1    9/2002 Miyazaki et al.
(Continued)

FOREIGN PATENT DOCUMENTS

JP    2000-268811 A    9/2000
JP    2004-063406 A    2/2004
(Continued)

OTHER PUBLICATIONS

International Search Report (ISR) (PCT Form PCT/ISA/210), in PCT/JP2018/026493, dated Aug. 7, 2018.

*Primary Examiner* — Cynthia H Kelly
*Assistant Examiner* — Monique M Wills
(74) *Attorney, Agent, or Firm* — McGinn I.P. Law Group, PLLC.

(57) ABSTRACT

An energy storage device includes a case. The case includes a cover body where an electrolyte solution filling port is formed, and an electrolyte solution plug that closes the electrolyte solution filling port. The electrolyte solution plug includes a shaft part inserted into the electrolyte solution filling port, and a projecting part that projects from a periphery of the shaft part and is bonded to the cover body. In the cover body, a space adjacent to the shaft part is formed around the electrolyte solution filling port, and a tip end of the shaft part is disposed in the electrolyte solution filling port.

19 Claims, 9 Drawing Sheets

(56) References Cited

U.S. PATENT DOCUMENTS

| | | | |
|---|---|---|---|
| 2004/0115521 A1 | 6/2004 | Cho | |
| 2009/0136843 A1 | 5/2009 | Yamamoto et al. | |
| 2012/0251850 A1 | 10/2012 | Yamamoto et al. | |
| 2013/0115490 A1 | 5/2013 | Kim et al. | |
| 2013/0130079 A1* | 5/2013 | Kako | H01M 10/04 429/82 |
| 2014/0322565 A1 | 10/2014 | Kusama et al. | |
| 2015/0104700 A1 | 4/2015 | Takasu et al. | |
| 2015/0140368 A1 | 5/2015 | Hirakawa et al. | |
| 2015/0236336 A1 | 8/2015 | Hirakawa et al. | |
| 2016/0013460 A1 | 1/2016 | Fukunaga et al. | |
| 2016/0164067 A1 | 6/2016 | Kobayashi | |
| 2016/0344000 A1 | 11/2016 | Takasu et al. | |

FOREIGN PATENT DOCUMENTS

| | | |
|---|---|---|
| JP | 2004-103579 A | 4/2004 |
| JP | 2005-190776 A | 7/2005 |
| JP | 2008-041548 A | 2/2006 |
| JP | 2007-035343 A | 2/2007 |
| JP | 2007-103158 A | 4/2007 |
| JP | 2007103286 A * | 4/2007 |
| JP | 2008-117605 A | 5/2008 |
| JP | 2009-087659 A | 4/2009 |
| JP | 2009-152183 A | 7/2009 |
| JP | 2013-025977 A | 2/2013 |
| JP | 2013-058409 A | 3/2013 |
| JP | 2013-098167 A | 5/2013 |
| JP | 2013-114910 A | 6/2013 |
| JP | 2013-171801 A | 9/2013 |
| JP | 2013-182722 A | 9/2013 |
| JP | 5382205 B2 | 1/2014 |
| JP | 2014-022095 A | 2/2014 |
| JP | 2014-026865 A | 2/2014 |
| JP | 2014-093230 A | 5/2014 |
| JP | 2014-170648 A | 9/2014 |
| JP | 2014-229444 A | 12/2014 |
| JP | 2015-141872 A | 8/2015 |
| JP | 2015-176637 A | 10/2015 |
| JP | 2016-110838 A | 6/2016 |
| JP | 2016-154092 A | 8/2016 |
| JP | 5967453 B2 | 8/2016 |
| JP | 2017-091721 A | 5/2017 |
| JP | 2017-139126 A | 8/2017 |
| JP | 2017-188465 A | 10/2017 |
| JP | 2017-224417 A | 12/2017 |
| WO | WO 2012/160907 A1 | 11/2012 |

* cited by examiner

ENERGY STORAGE DEVICE

TECHNICAL FIELD

The present invention relates to an energy storage device including a case, the case having a wall where an electrolyte solution filling port is formed and an electrolyte solution plug that closes the electrolyte solution filling port.

BACKGROUND ART

Conventionally, there is widely known an energy storage device including a case; and the case includes a wall where an electrolyte solution filling port is formed, and an electrolyte solution plug that closes the electrolyte solution filling port. For example, Patent Document 1 discloses a sealed battery (energy storage device) including a case; and the case includes a sealing plate (wall) having an electrolyte solution filling hole (electrolyte solution filling port), and a sealing plug (electrolyte solution plug) to seal the electrolyte solution filling hole. In the sealed battery disclosed in Patent Document 1, the sealing plug includes a press-fit member that is press-fitted into the electrolyte solution filling hole to close the electrolyte solution filling hole, thereby maintaining performance of sealing the electrolyte solution filling hole for a long period of time.

PRIOR ART DOCUMENT

Patent Document

Patent Document 1: JP-A-2014-170648

SUMMARY OF THE INVENTION

Problems to be Solved by the Invention

Here, typically, in a conventional energy storage device, a part of the electrolyte solution plug inserted into the electrolyte solution filling port is disposed to project inward from the electrolyte solution filling port. For example, in Patent Document 1, in order to reliably close the electrolyte solution filling hole with the press-fit member of the sealing plug, the press-fit member is press-fitted into the electrolyte solution filling hole until a tip end of the press-fit member projects inward from the electrolyte solution filling hole. However, in this case, electrolytic solution inside the case is brought to flow up and out of the electrolyte solution filling port through the part of the electrolyte solution plug, such as the press-fit member, inserted into the electrolyte solution filling port. Thus, when the electrolyte solution plug is bonded to the wall of the case by welding or others, the electrolyte solution flowing up and out of the electrolyte solution filling port causes a bonding failure between the electrolyte solution plug and the wall of the case.

The present invention has been made in light of such problems, and an object of the present invention is to provide an energy storage device configured to suppress the bonding failure between the electrolyte solution plug and the wall of the case.

Means for Solving the Problems

In order to achieve the object, an aspect of the present invention provides an energy storage device including a case. In the energy storage device, the case includes a wall where an electrolyte solution filling port is formed, and an electrolyte solution plug that closes the electrolyte solution filling port. The electrolyte solution plug includes a shaft part inserted into the electrolyte solution filling port, and a projecting part that projects from a periphery of the shaft part and is bonded to the wall. In the wall, a space adjacent to the shaft part is formed around the electrolyte solution filling port, and a tip end of the shaft part is disposed in the electrolyte solution filling port.

Another aspect of the present invention provides an energy storage device including a case. In the energy storage device, the case includes a wall where an electrolyte solution filling port is formed, and an electrolyte solution plug that closes the electrolyte solution filling port. The electrolyte solution plug includes: a shaft part that is formed in a cylindrical shape, extends in a first direction, and is inserted into the electrolyte solution filling port; and a projecting part that projects in a second direction orthogonal to the first direction from a periphery of the shaft part in a cross-sectional view, and is bonded to an outer face of the wall. The shaft part and the projecting part are integrally formed by a metal member as a single piece. In the wall, a recess that is recessed from the outer face is formed around the electrolyte solution filling port, and a space is formed between the shaft part, the projecting part, and the recess. The shaft part includes a cylindrical portion that has an identical diameter from the projecting part to an entrance of the electrolyte solution filling port.

Advantages of the Invention

The present invention provides an energy storage device configured to suppress a bonding failure between an electrolyte solution plug and a wall of a case.

MODE FOR CARRYING OUT THE INVENTION

Figure 1:
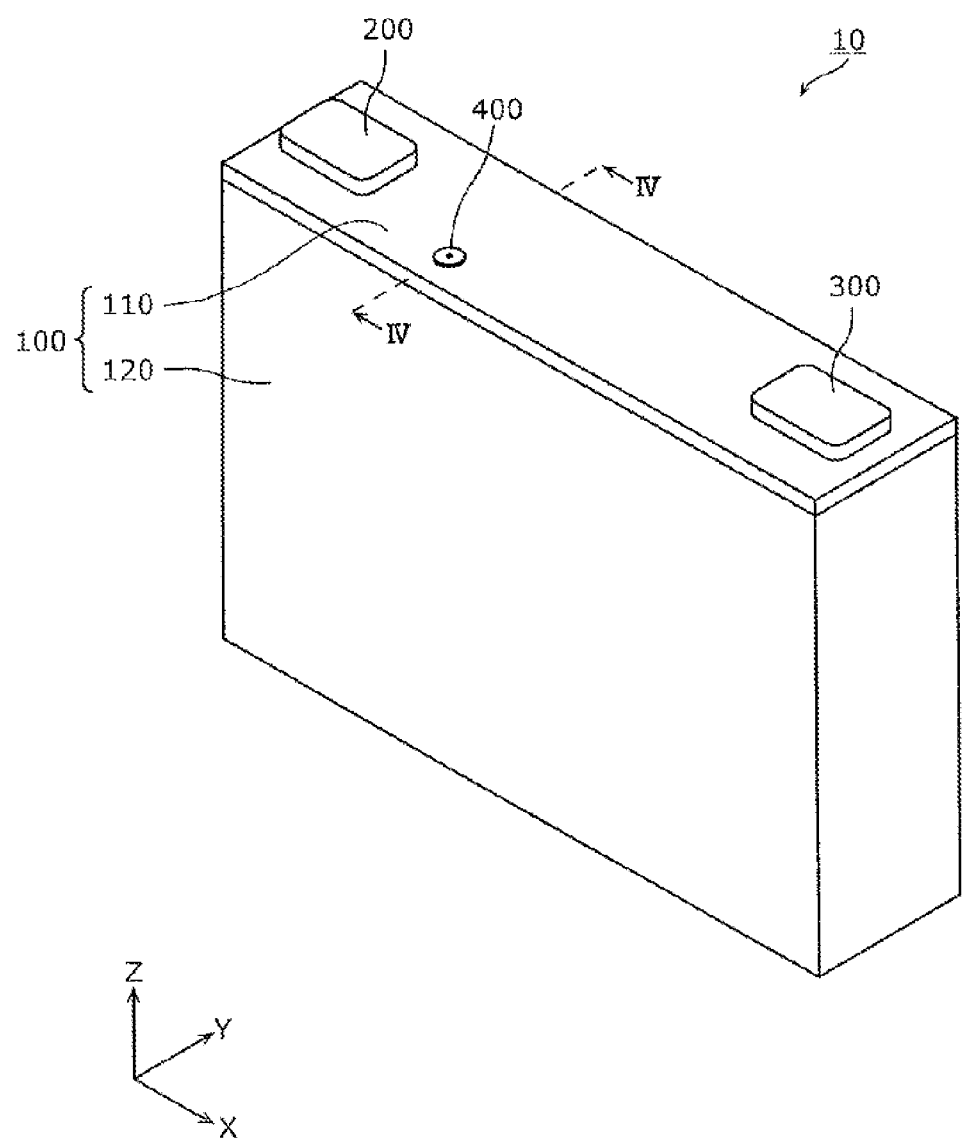
FIG. 1 is a perspective view illustrating an external appearance of an energy storage device according to an embodiment.

An object of the present invention is to provide an energy storage device configured to suppress a bonding failure between an electrolyte solution plug and a wall of a case.

In order to achieve the object, an aspect of the present invention provides an energy storage device including a case. In the energy storage device, the case includes a wall where an electrolyte solution filling port is formed, and an electrolyte solution plug that closes the electrolyte solution filling port. The electrolyte solution plug includes a shaft part inserted into the electrolyte solution filling port, and a projecting part that projects from a periphery of the shaft part and is bonded to the wall. In the wall, a space adjacent to the shaft part is formed around the electrolyte solution filling port, and a tip end of the shaft part is disposed in the electrolyte solution filling port.

With the energy storage device configured as above, in the wall of the case, the space adjacent to the shaft part of the electrolyte solution plug is formed around the electrolyte solution filling port, and the tip end of the shaft part of the electrolyte solution plug is disposed in the electrolyte solution filling port. That is, when electrolytic solution is attached to the shaft part of the electrolyte solution plug, the electrolyte solution enters to flow upward between the shaft part and an inner peripheral face of the electrolyte solution filling port. In this state, when a contact area between the shaft part and the inner peripheral face of the electrolyte solution filling port is larger, an amount of the electrolyte solution entering to flow upward increases. In view of this, having the space adjacent to the shaft part of the electrolyte solution plug formed around the electrolyte solution filling port, and concurrently, having the tip end of the shaft part of the electrolyte solution plug disposed in the electrolyte solution filling port, the energy storage device reduces the contact area between the shaft part and the inner peripheral face of the electrolyte solution filling port. Consequently, the energy storage device reduces the amount of the electrolyte solution entering to flow upward between the shaft part and the inner peripheral face of the electrolyte solution filling port. Further, having the tip end of the shaft part of the electrolyte solution plug disposed in the electrolyte solution filling port, the tip end of the shaft part is brought to play a role as a cover. Here, the electrolyte solution attached to an area in the electrolyte solution filling port, the area lower than the tip end of the shaft part of the electrolyte solution plug, is less prone to enter between the shaft part and the inner peripheral face of the electrolyte solution filling port. Accordingly, the electrolyte solution is less prone to flow up and out of the electrolyte solution filling port. Concurrently, having the space adjacent to the shaft part of the electrolyte solution plug formed around the electrolyte solution filling port, the energy storage device stores the electrolytic solution in the space, and thus, the electrolyte solution is even less prone to flow up and out of the electrolyte solution filling port. With this configuration, the energy storage device suppresses the bonding failure between the electrolyte solution plug and the wall of the case.

In an axial direction of the shaft part, a distance between the tip end of the shaft part and an inner face of the wall may be greater than a length of a portion where the shaft part abuts the inner peripheral face of the electrolyte solution filling port.

With the energy storage device described above, in the axial direction of the shaft part of the electrolyte solution plug, the distance between the tip end of the shaft part and the inner face of the wall of the case is configured to be greater than the length of the portion where the shaft part abuts the inner peripheral face of the electrolyte solution filling port. The distance between the tip end of the shaft part and the inner face of the wall is configured to be greater, and the length of the portion where the shaft part abuts the inner peripheral face of the electrolyte solution filling port is configured to be smaller. In this state, the contact area between the shaft part and the inner peripheral face of the electrolyte solution filling port is reduced, and thus, the amount of the electrolyte solution entering between the shaft part and the inner peripheral face of the electrolyte solution filling port is reduced. Accordingly, the electrolyte solution is even less prone to flow up and out of the electrolyte solution filling port.

Further, in the axial direction of the shaft part, the length of the portion where the shaft part abuts the inner peripheral face of the electrolyte solution filling port may be smaller than a length of a border between the shaft part and the space.

With the energy storage device described above, in the axial direction of the shaft part of the electrolyte solution plug, the length of the portion where the shaft part abuts the inner peripheral face of the electrolyte solution filling port is configured to be smaller than the length of the border between the shaft part and the space. The length of the portion where the shaft part abuts the inner peripheral face of the electrolyte solution filling port is configured to be smaller, and the length of the border between the shaft part and the space is configured to be larger. In this state, the contact area between the shaft part and the inner peripheral face of the electrolyte solution filling port is reduced, and an amount of the electrolytic solution to be stored is increased. Accordingly, the electrolyte solution is even less prone to flow up and out of the electrolyte solution filling port.

The wall may have an inclined face that is disposed adjacent to the space and is inclined inward of the case as closer to the electrolyte solution filling port.

With the energy storage device configured as above, the wall of the case has the inclined face that is inclined inward of the case as closer to the electrolyte solution filling port. In this state, the inclined face suppresses the electrolyte solution from flowing upward. Accordingly, the electrolyte solution is even less prone to flow up and out of the electrolyte solution filling port.

The portion of the shaft part adjacent to the space may have a diameter equal to or smaller than a diameter of the portion of the shaft part that abuts the inner peripheral face of the electrolyte solution filling port.

When the electrolyte solution filling port is formed in the wall, a burr may be formed to protrude upward or toward the space from a vicinity of an entrance of the electrolyte solution filling port. In this case, when the portion of the shaft part adjacent to the space is larger in diameter than the portion of the shaft part that abuts the inner peripheral face of the electrolyte solution filling port, the burr interferes with the portion larger in diameter to cause the electrolyte solution plug to rise. The rise of the electrolyte solution plug may cause a bonding failure between the projecting part of the electrolyte solution plug and the wall of the case. Accordingly, having the diameter of the portion of the shaft part that is adjacent to the space equal to or smaller than the diameter of the portion of the shaft part that abuts the inner peripheral face of the electrolyte solution filling port, the energy storage device may suppress the rise of the electrolyte solution plug caused by the burr interfering with the shaft part. With this configuration, the energy storage device suppresses the bonding failure between the electrolyte solution plug and the wall of the case.

Another aspect of the present invention provides an energy storage device including a case. In the energy storage device, the case includes a wall where an electrolyte solution filling port is formed, and an electrolyte solution plug that closes the electrolyte solution filling port. The electrolyte solution plug includes: a shaft part that is formed in a cylindrical shape, extends in a first direction, and is inserted into the electrolyte solution filling port; and a projecting part that projects in a second direction orthogonal to the first direction from a periphery of the shaft part in a cross-sectional view, and is bonded to an outer face of the wall. The shaft part and the projecting part are integrally formed by a metal member as a single piece. In the wall, a recess that is recessed from the outer face is formed around the electrolyte solution filling port, and a space is formed between the shaft part, the projecting part, and the recess. The shaft part includes a cylindrical portion that has an identical diameter from the projecting part to an entrance of the electrolyte solution filling port.

When electrolytic solution is attached to the shaft part of the electrolyte solution plug, the electrolyte solution enters to flow upward between the shaft part and an inner peripheral face of the electrolyte solution filling port. In this state, when a contact area between the shaft part and the inner peripheral face of the electrolyte solution filling port is larger, an amount of the electrolyte solution entering to flow upward increases. In view of this, having the space adjacent to the shaft part of the electrolyte solution plug formed, and concurrently, having the shaft part of the electrolyte solution plug disposed in the electrolyte solution filling port, the energy storage device reduces the contact area between the shaft part and the inner peripheral face of the electrolyte solution filling port. Consequently, the energy storage device reduces the amount of the electrolyte solution entering to flow upward between the shaft part and the inner peripheral face of the electrolyte solution filling port. Further, having the shaft part of the electrolyte solution plug disposed in the electrolyte solution filling port, the tip end of the shaft part is brought to play a role as a cover. Here, the electrolyte solution attached to an area in the electrolyte solution filling port, the area lower than the tip end of the shaft part of the electrolyte solution plug, is less prone to enter between the shaft part and the inner peripheral face of the electrolyte solution filling port. Accordingly, the electrolyte solution is less prone to flow up and out of the electrolyte solution filling port. Concurrently, having the space adjacent to the shaft part of the electrolyte solution plug formed around the electrolyte solution filling port, the energy storage device stores the electrolytic solution in the space, and thus, the electrolyte solution is even less prone to flow up and out of the electrolyte solution filling port. Further, in a case that the shaft part of the electrolyte solution plug and the projecting part to be bonded to the wall are formed of different members, a portion of the shaft part adjacent to the space needs to be increased in diameter, so that the shaft part is prevented from dropping into the energy storage device out of the electrolyte solution filling port. However, when the portion of the shaft part adjacent to the space is increased in diameter, a burr may exist protruding upward or toward the space from a vicinity of the entrance of the electrolyte solution filling port. In this case, the burr interferes with the portion increased in diameter to cause the shaft part to rise from the electrolyte solution filling port. The rise of the shaft part from the electrolyte solution filling port hinders the energy storage device from suppressing the electrolyte solution from flowing up and out of the electrolyte solution filling port. Consequently, the electrolyte solution may cause a bonding failure between the electrolyte solution plug and the wall of the case. In view of this, having the shaft part and the projecting part of the electrolyte solution plug integrally formed by the metal member as the single piece, the energy storage device prevents the shaft part from dropping into the energy storage device out of the electrolyte solution filling port. Concurrently, having the shaft part formed in the cylindrical shape having the identical diameter from the projecting part to the entrance of the electrolyte solution filling port, the energy storage device prevents the rise of the electrolyte solution plug caused by the burr interfering with the shaft part. With this configuration, the energy storage device suppresses the bonding failure between the electrolyte solution plug and the wall of the case.

Note that the present invention provides not only an energy storage device but also a case accommodated in the energy storage device, the case including a wall and an electrolyte solution plug.

An energy storage device according to an embodiment of the present invention and modifications thereof will be described below with reference to the appended drawings. It should be noted that the embodiment and the modifications thereof are intended to illustrate comprehensive or specific examples. In the embodiment and the modifications thereof, numerical values, shapes, materials, constituent elements, positions and connections of the constituent elements, and others are merely illustrative; therefore, the present invention is not limited to the embodiment and the modifications thereof. Further, among the constituent elements in the embodiment and the modifications thereof, constituent elements, which are not described in independent claims describing an uppermost concept, are described as arbitrary constituent elements. Additionally, in the appended drawings, the constituent elements are not always described strictly accurately in size or others.

In the description below of the embodiment and the appended drawings, an aligned direction of a pair of electrode terminals, an aligned direction of a pair of current collectors, an aligned direction of both ends of an electrode assembly (a pair of active material non-formed units), a wound direction of the electrode assembly, a width direction of a leg part of each of the current collectors, or an opposing direction between short side faces of the case, all these constituent elements included in the energy storage device, will be defined as an X-axis direction. Additionally, an opposing direction between long side faces of the case, a widthwise direction of the short side faces of the case, or a thickness direction of the case will be defined as a Y-axis direction. Further, an aligned direction of a case body of the energy storage device and a cover body of the energy storage device, a lengthwise direction of the short side faces of the case, an extending direction of the leg part of each of the current collectors, or a top-to-bottom direction will be defined as a Z-axis direction. The X-axis direction, the Y-axis direction, and the Z-axis direction intersect each other (extends orthogonally to each other in this embodiment). Note that, in some aspects, the Z-axis direction may not correspond to the top-to-bottom direction, but for convenience of description, the Z-axis direction will be described below as the top-to-bottom direction. Note also that, in the description below, for example, a plus X-axis direction corresponds to an arrow X-axis direction, and a minus X-axis direction corresponds to an opposite direction of the plus X-axis direction. The same applies to the Y-axis direction and the Z-axis direction.

Embodiment

[1. Overall Description of Energy Storage Device 10]

Figure 2:
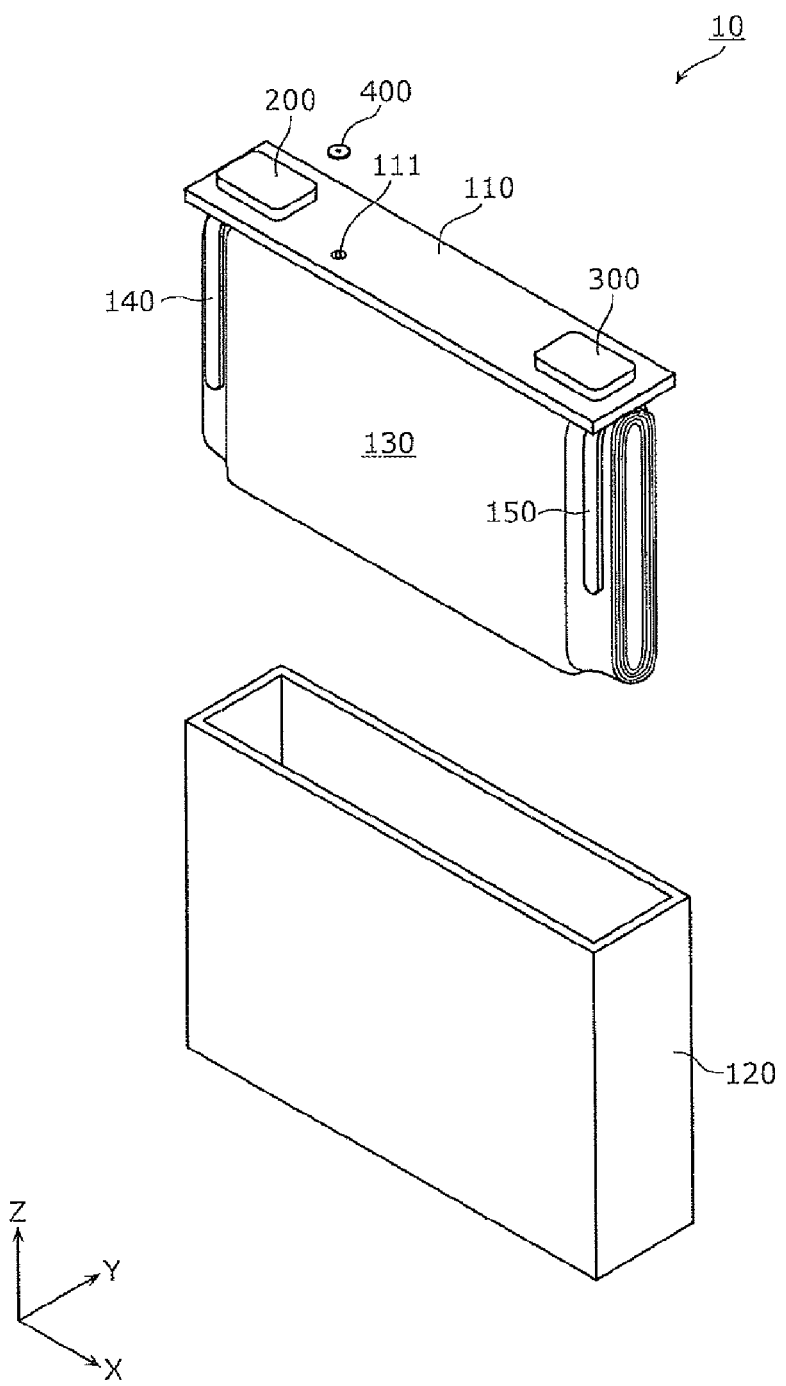
FIG. 2 is a perspective view illustrating each constituent element included in the energy storage device according to the embodiment.

First, an overall description of an energy storage device 10 according to this embodiment will be provided with reference to FIG. 1 and FIG. 2. FIG. 1 is a perspective view illustrating an external appearance of the energy storage device 10 according to this embodiment. FIG. 2 is a perspective view illustrating each constituent element included in the energy storage device 10 according to this embodiment. Specifically, FIG. 2 is a perspective view illustrating a configuration of the energy storage device 10 from which each of a case body 120 and an electrolyte solution plug 400 is separated.

The energy storage device 10 is a secondary battery configured to charge and discharge electricity, and specifically, is a nonaqueous electrolyte secondary battery such as a lithium ion secondary battery. The energy storage device 10 is used, for example, as a power source for vehicles such as an electric vehicle (EV), a hybrid electric vehicle (HEV), or a plug-in hybrid electric vehicle (PHEV), a power source for electronic devices, or a power storage power source. The energy storage device 10 is not limited to the nonaqueous electrolyte secondary battery, and may be other secondary batteries in addition to the nonaqueous electrolyte secondary battery. Alternatively, the energy storage device 10 may be a capacitor, or even a primary battery from which the user may use stored electricity without charging the primary battery with electricity. Further, in this embodiment, the energy storage device 10 is illustrated in a rectangular (prismatic) shape; however, the shape is not limited to the rectangular shape and may alternatively be a cylindrical shape, a long cylindrical shape, or others. Still alternatively, the energy storage device 10 may be a laminate-type energy storage device.

As illustrated in FIG. 1, the energy storage device 10 includes a case 100, a positive electrode terminal 200, and a negative electrode terminal 300. The case 100 includes a cover body 110 and the case body 120. As illustrated in FIG. 2, the case 100 also internally includes an electrode assembly 130, a positive electrode current collector 140, and a negative electrode current collector 150.

Note that, while not illustrated in FIG. 1 and FIG. 2, a gasket or the like is disposed at a position between the cover body 110 and the positive electrode terminal 200 and at a position between the cover body 110 and the positive electrode current collector 140 so as to improve insulation and airtightness. The same applies to a position between the cover body 110 and the negative electrode terminal 300 and a position between the cover body 110 and the negative electrode current collector 150. Further, while not illustrated, electrolyte solution (nonaqueous electrolyte) is sealed in the case 100. Note that the electrolyte solution is not limited to a particular kind, provided that performance of the energy storage device 10 is not degraded; and thus, various kinds of electrolyte solution may be selected. In addition to the constituent elements described above, the case 100 may include a spacer to be disposed alongside each of the positive electrode current collector 140 and the negative electrode current collector 150, a gas release valve to release pressure when the pressure increases in the case 100, or an insulation film to cover the electrode assembly 130.

The case 100 is a cuboid-shaped (box-shaped) case that includes the case body 120 formed in a rectangular tube shape and having a bottom, and the cover body 110 as a plate-shaped member for closing an opening of the case body 120. Specifically, the cover body 110 is a wall formed in a rectangular, flat plate shape and extending in the X-axis direction. The cover body 110 is disposed in a plus Z-axis direction of the case body 120. The case body 120 has five walls: a rectangular, flat plate-shaped bottom wall positioned in a minus Z-axis direction; two long, rectangular and flat plate-shaped side walls, one positioned in a plus Y-axis direction and the other in a minus Y-axis direction; and two short, rectangular and flat plate-shaped side walls, one positioned in the plus X-axis direction and the other in the minus X-axis direction. The case body 120 internally accommodates an electrode assembly 130 and others, and then the case body 120 is welded with the cover body 110. Consequently, the case 100 is hermetically sealed. A material of each of the cover body 110 and the case body 120 is not particularly limited, but may preferably be a weldable metal such as stainless steel, aluminum, aluminum alloy, iron, or plated steel sheet.

As illustrated in FIG. 2, the cover body 110 has an electrolyte solution filling port 111 formed therein. The electrolyte solution filling port 111 is, for example, a circular-shaped through hole formed in the cover body 110, and is used to fill the electrolytic solution at manufacturing of the energy storage device 10. In this embodiment, the electrolyte solution filling port 111 is disposed closer to the minus X-axis direction and closer to the minus Y-axis direction of the cover body 110. Note that the electrolyte solution filling port 111 may be disposed at any position of the cover body 110.

Further, as illustrated in FIGS. 1 and 2, the cover body 110 has an electrolyte solution plug 400 disposed to close the electrolyte solution filling port 111. In other words, at manufacturing of the energy storage device 10, the electrolytic solution is filled into the case 100 from the electrolyte solution filling port 111, and the electrolyte solution plug 400 is bonded to the cover body 110 by welding or others to close the electrolyte solution filling port 111. Accordingly, the electrolyte solution is contained in the case 100. As has been described above, the case 100 includes the cover body 110 as the wall where the electrolyte solution filling port 111 is formed, and the electrolyte solution plug 400 to close the electrolyte solution filling port 111. A configuration of an area around the electrolyte solution filling port 111 of the cover body 110 and a configuration of the electrolyte solution plug 400 will be described in detail later.

The electrode assembly 130 includes a positive electrode plate, a negative electrode plate, and a separator, and is an energy storage element (power generating element) configured to store electricity. The positive electrode plate is a plate where a positive active material layer is formed on a positive electrode substrate layer as a long strip-shaped current collector foil made of aluminum, aluminum alloy, or the like. The negative electrode plate is a plate where a negative active material layer is formed on a negative electrode substrate layer as a long strip-shaped current collector foil made of copper, copper alloy, or the like. The separator is a microporous sheet made of resin or the like.

The separator is disposed and wound between the positive electrode plate and the negative electrode plate to form the electrode assembly 130. As illustrated in this embodiment, the electrode assembly 130 has an oval cross-sectional shape, but the shape may be elliptic, circular, polygonal, or others. The electrode assembly 130 is not limited to the wound shape, and may be formed in a laminate where flat plate-shaped plates are laminated.

The positive electrode terminal 200 is electrically connected to the positive electrode plate of the electrode assembly 130, and the negative electrode terminal 300 is electrically connected to the negative electrode plate of the electrode assembly 130. In other words, each of the positive electrode terminal 200 and the negative electrode terminal 300 is an electrode terminal made of metal that is configured to discharge the electricity stored in the electrode assembly 130 to space outside the energy storage device 10 and configured to introduce electricity into space inside the energy storage device 10 to store the electricity in the electrode assembly 130. Each of the positive electrode terminal 200 and the negative electrode terminal 300 is mounted on the cover body 110 that is disposed above the electrode assembly 130.

The positive electrode current collector 140 and the negative electrode current collector 150 are rigid conductive members, respectively disposed between the electrode assembly 130 and the walls of the case 100, and are electrically connected to the positive electrode terminal 200, the negative electrode terminal 300, the positive electrode plate of the electrode assembly 130, and the negative electrode plate of the electrode assembly 130. A material of the positive electrode current collector 140 is not limited, and is made of, for example, aluminum or aluminum alloy, as with the positive electrode substrate layer of the electrode assembly 130. Similarly, a material of the negative electrode current collector 150 is not limited, and is made of, for example, copper or copper alloy, as with the negative electrode substrate layer of the electrode assembly 130.

[2. Description of Configuration of Area Around Electrolyte Solution Filling Port 111 of Cover Body 110 and Configuration of Electrolyte Solution Plug 400]

Figure 3:
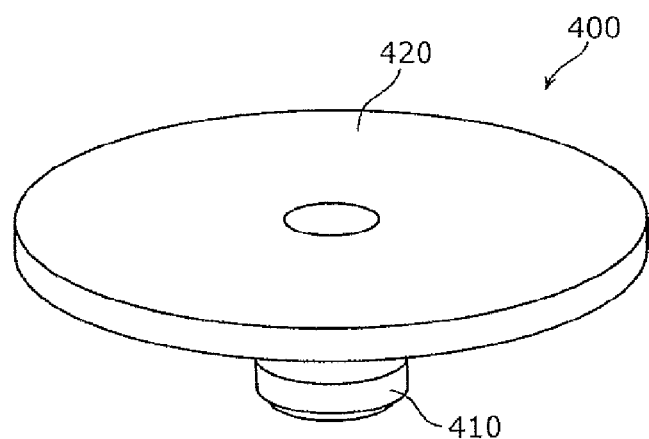
FIG. 3 is a perspective view illustrating a configuration of an area around an electrolyte solution filling port of a cover body according to the embodiment, and a configuration of an electrolyte solution plug according to the embodiment.
Figure 3:
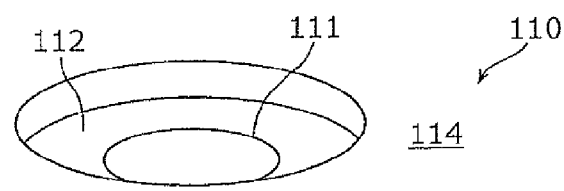
Figure 3:
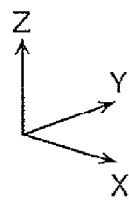
Figure 4:
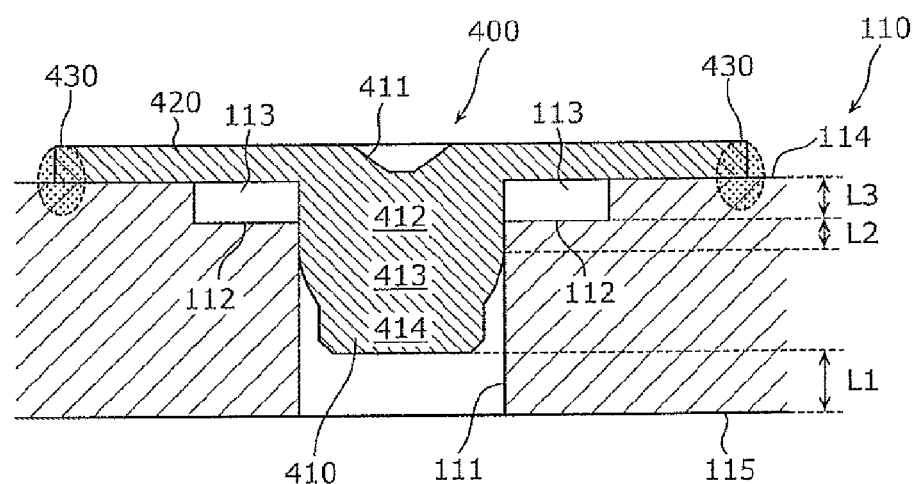
FIG. 4 is a cross-sectional view illustrating the configuration of the area around the electrolyte solution filling port of the cover body according to the embodiment, and the configuration of the electrolyte solution plug according to the embodiment.
Figure 4:
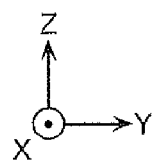

Next, the configuration of the area around the electrolyte solution filling port 111 of the cover body 110 and the configuration of the electrolyte solution plug 400 will be described in detail. FIG. 3 is a perspective view illustrating the configuration of the area around the electrolyte solution filling port 111 of the cover body 110 according to this embodiment, and the configuration of the electrolyte solution plug 400 according to this embodiment. Specifically, FIG. 3 is an enlarged perspective view illustrating the configuration of the area around the electrolyte solution filling port 111 of the cover body 110 in FIG. 2 and the configuration of the electrolyte solution plug 400 in FIG. 2. FIG. 4 is a cross-sectional view illustrating the configuration of the area around the electrolyte solution filling port 111 of the cover body 110 according to this embodiment, and the configuration of the electrolyte solution plug 400 according to this embodiment. Specifically, FIG. 4 is an enlarged cross-sectional view illustrating a configuration of the cover body 110 together with the electrolyte solution plug 400 as illustrated in FIG. 1. The enlarged cross-sectional view is taken along a plane perpendicular to a face of each of the cover body 110 and the electrolyte solution plug 400, the face including line IV-IV.

[2.1 Description of Configuration of Electrolyte Solution Plug 400]

First, the configuration of the electrolyte solution plug 400 will be described in detail. The electrolyte solution plug 400 is a member to be bonded to the cover body 110 by welding or others in a state where the electrolyte solution plug 400 closes the electrolyte solution filling port 111. A material of the electrolyte solution plug 400 is not particularly limited, and is made of, for example, a metal weldable to the cover body 110, such as stainless steel, aluminum, aluminum alloy, iron, or plated steel sheet. Here, as illustrated in FIGS. 3 and 4, the electrolyte solution plug 400 includes a shaft part 410 and a projecting part 420.

The shaft part 410 is a cylindrical-shaped part extending in the Z-axis direction (a first direction) and is to be inserted into the electrolyte solution filling port 111. Specifically, as illustrated in FIG. 4, the shaft part 410 includes a recess 411, a column 412, a reduced diameter portion 413, and a tip 414. The recess 411 is formed on an upper face of the column 412. The reduced diameter portion 413 is gradually reduced in diameter from the column 412 in the minus Z-axis direction. The tip 414 extends in the minus Z-axis direction from the reduced diameter portion 413.

The column 412 is a cylindrical portion of the shaft part 410 in the plus Z-axis direction. The recess 411 of cone shape is formed on a face of the column 412 in the plus Z-axis direction, and is recessed in the minus Z-axis direction. The recess 411 is used as a mark when, for example, bonding the electrolyte solution plug 400 to an outer face 114 of the cover body 110. In other words, the recess 411 is used to identify a position of the electrolyte solution plug 400, so that the electrolyte solution plug 400 is disposed in an accurate position on the outer face 114 before bonded to the outer face 114. The reduced diameter portion 413 is a curved line-shaped portion in a cross-sectional view in a Y-Z plane, having an outer edge shape that becomes gradually smaller in width in the Y-axis direction from a minus Z-axis end of the column 412 toward the minus Z-axis direction. The tip 414 is a cylindrical portion extending from a minus Z-axis end of the reduced diameter portion 413 toward the minus Z-axis direction. In other words, the tip 414 is a tip end portion of the shaft part 410 in the minus Z-axis direction.

The projecting part 420 projects in a second direction orthogonal to the Z-axis direction (first direction) from a periphery of the shaft part 410 in the cross-sectional view and is bonded to the cover body 110. Specifically, the projecting part 420 is an annular, flat plate-shaped (flat donut-shaped) part (flange) in a top view, and projects outward from the periphery (entire periphery) of an upper end of the shaft part 410 (i.e., an upper portion of the column 412). Note that the top view corresponds to a view as seen from the plus Z-axis direction. For example, an annular shape in the top view corresponds to an annular shape as seen from the plus Z-axis direction.

The projecting part 420 is mounted to the outer face 114 of the cover body 110 such that an inner face (a face in the minus Z-axis direction) of the projecting part 420 abuts the outer face 114. Then, an outer edge of the projecting part 420 is entirely bonded to the outer face 114. With this configuration, the outer edge of the projecting part 420 is bonded to the outer face 114 to form a bonded part 430 of annular shape in the top view. Specifically, the bonded part 430 is a welded part formed by welding (e.g., laser welding) the outer edge of the projecting part 420 to the outer face 114.

[2.2 Description of Configuration of Area Around Electrolyte Solution Filling Port 111 of Cover Body 110]

Next, a configuration of the area around the electrolyte solution filling port 111 of the cover body 110 will be described in detail. The electrolyte solution filling port 111 is, in the top view, the circular-shaped through hole into which the shaft part 410 is to be inserted. The electrolytic solution is filled into the case 100 through the electrolyte solution filling port 111. The electrolyte solution filling port 111 has, in the top view, an inner peripheral shape substantially identical to a peripheral shape of the column 412 of the shaft part 410. The cover body 110 has a step 112 around the electrolyte solution filling port 111. The step 112 is a stepped portion formed in a circular-shaped recess in the top view, and is disposed around the electrolyte solution filling port 111. In other words, the step 112 has a bottom face of annular shape in the top view, and a side face of cylindrical shape standing upright from a peripheral edge of the bottom.

With the step 112, the cover body 110 has a space 113 adjacent to the shaft part 410 formed around the electrolyte solution filling port 111. The space 113 is formed between the bonded part 430 and the shaft part 410, in other words, formed from a face where the projecting part 420 abuts the outer face 114 toward a peripheral face of the column 412. The space 113 is disposed between the inner face of the projecting part 420 closer to the column 412 and the bottom face of the step 112. In other words, the space 113 corresponds to space surrounded and formed between the bottom face of the step 112, the side face of the step 112, the peripheral face of the column 412 of the shaft part 410, and the inner face of the projecting part 420 closer to the column 412.

In a state where the space 113 is formed around the shaft part 410, the shaft part 410 of the electrolyte solution plug 400 is inserted into the electrolyte solution filling port 111 and disposed therein. Outside the space 113, the projecting part 420 of the electrolyte solution plug 400 abuts the outer face 114 of the cover body 110, so that the bonded part 430 is formed on the peripheral edge of the projecting part 420. Here, the shaft part 410 is inserted into the electrolyte solution filling port 111 in a state where the peripheral face of a lower portion of the column 412 abuts an inner peripheral face of the electrolyte solution filling port 111. In this embodiment, the shaft part 410 has the peripheral face of the lower portion of the column 412 entirely abutting the inner peripheral face of the electrolyte solution filling port 111. Alternatively, the peripheral face of the lower portion of the column 412 may only partially abut the inner peripheral face of the electrolyte solution filling port 111.

Here, a tip end of the shaft part 410 is disposed in the electrolyte solution filling port 111. That is, the tip 414 of the shaft part 410 is disposed in the electrolyte solution filling port 111. In other words, a tip edge of the tip 414 is disposed in the plus Z-axis direction with respect to an inner face 115 of the cover body 110. With such a configuration, the shaft part 410 is disposed in the electrolyte solution filling port 111 (a positional relationship between the tip 414 and the space 113 is) as follows.

In an axial direction of the shaft part 410, a distance between the tip end of the shaft part 410 and the inner face 115 of the cover body 110 is greater than a length of a portion where the shaft part 410 abuts the inner peripheral face of the electrolyte solution filling port 111. In other words, in the axial direction (Z-axis direction) of the shaft part 410, the distance between the tip 414 and the inner face 115 (L1 in FIG. 4) is configured to be greater than the length of the portion where the column 412 abuts the inner peripheral face of the electrolyte solution filling port 111 (L2 in FIG. 4), thereby resulting in (L1>L2).

Further, in the axial direction of the shaft part 410, the length of the portion where the shaft part 410 abuts the inner peripheral face of the electrolyte solution filling port 111 is smaller than a length of a border between the shaft part 410 and the space 113. In other words, in the axial direction (Z-axis direction) of the shaft part 410, the length of the portion where the column 412 abuts the inner peripheral face of the electrolyte solution filling port 111 (L2 in FIG. 4) is configured to be smaller than the length of the border between the column 412 and the space 113 (L3 in FIG. 4), thereby resulting in (L2<L3). In this embodiment, the relationship corresponds to L1>L3>L2, but the relationship may alternatively be L1=L3>L2 or L3>L1>L2.

The shape of the shaft part 410 is not limited to the cylindrical shape, and may be, for example, a prismatic column type. The shape of the projecting part 420 is not limited to the annular type in the top view, and may be, for example, elliptic, oval, or polygonal annular in the top view. Concurrently, the shape of the electrolyte solution filling port 111 is not limited to the circular type in the top view, and may be, for example, elliptic, oval, or polygonal in the top view. Further, the electrolyte solution filling port 111 may be different in shape or size from a peripheral shape of the shaft part 410. Similarly, the shape and a size of the step 112 are not particularly limited.

[3. Description of Effects]

As has been described above, with the energy storage device 10 according to the embodiment of the present invention, the cover body 110 as the wall of the case 100 has the space 113 adjacent to the shaft part 410 of the electrolyte solution plug 400 formed around the electrolyte solution filling port 111, and the electrolyte solution plug 400 has the tip end of the shaft part 410 disposed in the electrolyte solution filling port 111. That is, when the electrolytic solution is attached to the shaft part 410 of the electrolyte solution plug 400, the electrolyte solution enters to flow upward between the shaft part 410 and the inner peripheral face of the electrolyte solution filling port 111. In this state, when a contact area between the shaft part 410 and the inner peripheral face of the electrolyte solution filling port 111 is larger, an amount of the electrolyte solution entering to flow upward increases. In view of this, having the space 113 adjacent to the shaft part 410 of the electrolyte solution plug 400 formed around the electrolyte solution filling port 111, and concurrently, having the tip end of the shaft part 410 of the electrolyte solution plug 400 disposed in the electrolyte solution filling port 111, the energy storage device 10 reduces the contact area between the shaft part 410 and the inner peripheral face of the electrolyte solution filling port 111. Consequently, the energy storage device 10 reduces the amount of the electrolyte solution entering to flow upward between the shaft part 410 and the inner peripheral face of the electrolyte solution filling port 111. Further, having the tip end of the shaft part 410 of the electrolyte solution plug 400 disposed in the electrolyte solution filling port 111, the tip end of the shaft part 410 is brought to play a role as a cover. Here, the electrolyte solution attached to an area in the electrolyte solution filling port 111, the area lower than the tip end of the shaft part 410 of the electrolyte solution plug 400, is less prone to enter between the shaft part 410 and the inner peripheral face of the electrolyte solution filling port 111. Accordingly, the electrolyte solution is less prone to flow up and out of the electrolyte solution filling port 111. Concurrently, having the space 113 adjacent to the shaft part 410 of the electrolyte solution plug 400 formed around the electrolyte solution filling port 111, the energy storage device 10 stores the electrolytic solution in the space 113, and thus, the electrolyte solution is even less prone to flow up and out of the electrolyte solution filling port 111. With this configuration, the energy storage device 10 suppresses a bonding failure (welding failure) between the electrolyte solution plug 400 and the cover body 110.

Further, when the electrolyte solution filling port 111 is formed, a burr may be formed to protrude from the inner peripheral face of the electrolyte solution filling port 111 toward the projecting part 420 of the electrolyte solution plug 400. In this case, without the space 113 formed around the electrolyte solution filling port 111, the burr may interfere with the projecting part 420 of the electrolyte solution plug 400 to cause the projecting part 420 to rise, thereby leading to the bonding failure between the projecting part 420 and the cover body 110. Accordingly, having the space 113 formed around the electrolyte solution filling port 111, the energy storage device 10 may suppress the rise of the projecting part 420 caused by the burr interfering with the projecting part 420, so as to suppress the bonding failure between the projecting part 420 and the cover body 110.

Additionally, the electrolyte solution plug 400 includes the shaft part 410, and the shaft part 410 is inserted into the electrolyte solution filling port 111. Thus, the electrolyte solution plug 400 is easily disposed with respect to the electrolyte solution filling port 111, and then is easily bonded to the cover body 110. With this configuration, the energy storage device 10 suppresses the bonding failure between the electrolyte solution plug 400 and the cover body 110.

With the energy storage device 10, in the axial direction of the shaft part 410 of the electrolyte solution plug 400, the distance between the tip end of the shaft part 410 and the inner face 115 of the cover body 110 of the case 100 (i.e., L1) is configured to be greater than the length of the portion where the shaft part 410 abuts the inner peripheral face of the electrolyte solution filling port 111 (i.e., L2). The distance between the tip end of the shaft part 410 and the inner face 115 of the cover body 110 (L1) is configured to be greater, and the length of the portion where the shaft part 410 abuts the inner peripheral face of the electrolyte solution filling port 111 (L2) is configured to be smaller. In this state, the contact area between the shaft part 410 and the inner peripheral face of the electrolyte solution filling port 111 is reduced, and thus, the amount of the electrolyte solution entering between the shaft part 410 and the inner peripheral face of the electrolyte solution filling port 111 is reduced. With this configuration, the electrolyte solution is even less prone to flow up and out of the electrolyte solution filling port 111.

Further, with the energy storage device 10, in the axial direction of the shaft part 410 of the electrolyte solution plug 400, the length of the portion where the shaft part 410 abuts the inner peripheral face of the electrolyte solution filling port 111 (L2) is configured to be smaller than the length of the border between the shaft part 410 and the space 113 (i.e., L3). The length of the portion where the shaft part 410 abuts the inner peripheral face of the electrolyte solution filling port 111 (L2) is configured to be smaller, and the length of the border between the shaft part 410 and the space 113 (L3) is configured to be larger. In this state, the contact area between the shaft part 410 and the inner peripheral face of the electrolyte solution filling port 111 is reduced, and concurrently, an amount of the electrolytic solution stored is increased. With this configuration, the electrolyte solution is even less prone to flow up and out of the electrolyte solution filling port 111.

[4. Description of Modification of Embodiment]
(First Modification and Second Modification)

Figure 5:
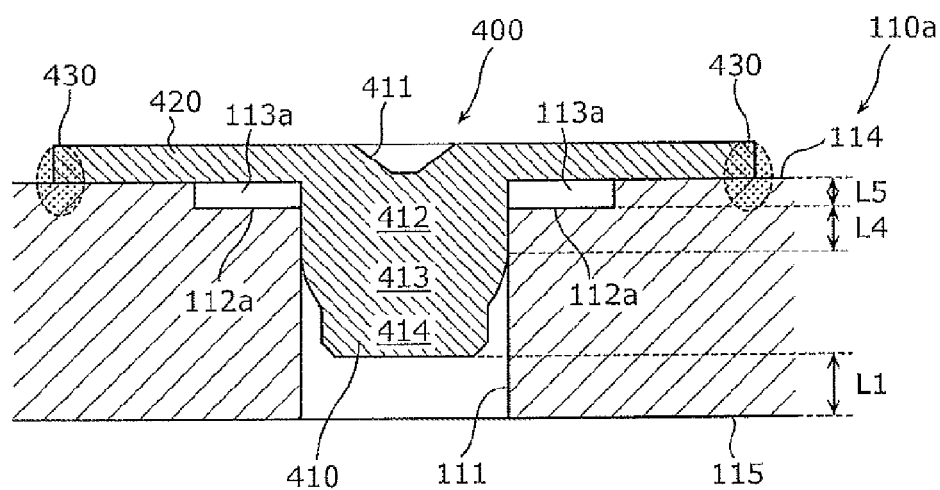
FIG. 5 is a cross-sectional view illustrating a configuration of an area around an electrolyte solution filling port of a cover body according to a first modification, and a configuration of an electrolyte solution plug according to the first modification.
Figure 5:
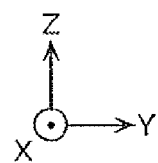
Figure 6:
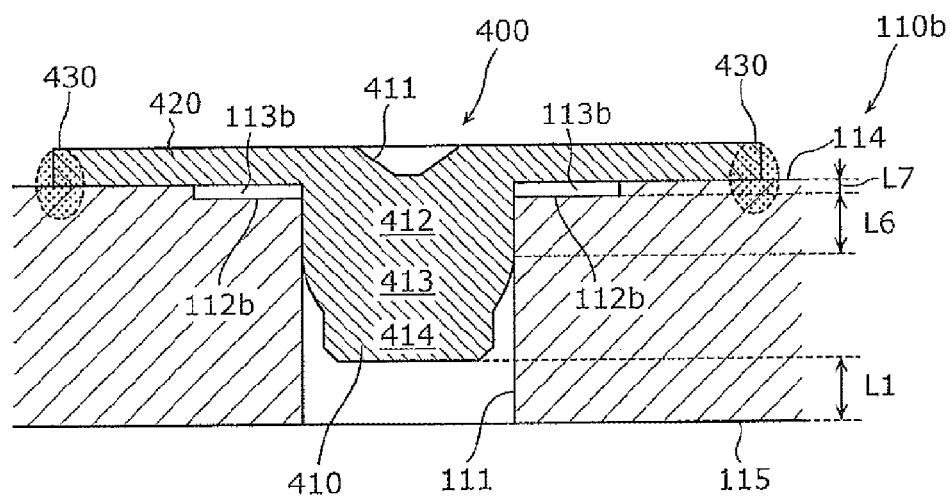
FIG. 6 is a cross-sectional view illustrating a configuration of an area around an electrolyte solution filling port of a cover body according to a second modification, and a configuration of an electrolyte solution plug according to the second modification.
Figure 6:
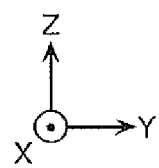

Next, a first modification and a second modification of the foregoing embodiment will be described. FIG. 5 is a cross-sectional view illustrating a configuration of an area around an electrolyte solution filling port 111 of a cover body 110a according to the first modification, and a configuration of an electrolyte solution plug 400 according to the first modification. FIG. 6 is a cross-sectional view illustrating a configuration of an area around an electrolyte solution filling port 111 of a cover body 110b according to the second modification, and a configuration of an electrolyte solution plug 400 according to the second modification. Note that each of FIGS. 5 and 6 corresponds to FIG. 4 in the foregoing embodiment.

As illustrated in FIG. 5, the cover body 110a in the first modification has a step 112a instead of the step 112 of the cover body 110 in the foregoing embodiment. The step 112a is formed smaller in height (is positioned higher) than the step 112 in the foregoing embodiment. Thus, the cover body 110a has a space 113a formed around the electrolyte solution filling port 111, the space 113a smaller in height than the space 113 in the foregoing embodiment. In this modification, other constituent elements represent identical or equivalent to those in the foregoing embodiment, and thus a description thereof will be omitted.

With such a configuration, in the axial direction (Z-axis direction) of a shaft part 410, a distance between a tip end of the shaft part 410 and an inner face 115 of the cover body 110a (L1 in FIG. 5) is greater than a length of a portion where the shaft part 410 abuts an inner peripheral face of the electrolyte solution filling port 111 (L4 in FIG. 5), thereby resulting in (L1>L4). Concurrently, in the axial direction (Z-axis direction) of the shaft part 410, the length of the portion where the shaft part 410 abuts the inner peripheral face of the electrolyte solution filling port 111 (L4 in FIG. 5) is greater than a length of a border between the shaft part 410 and the space 113a (L5 in FIG. 5), thereby resulting in (L4>L5). In other words, the relationship corresponds to L1>L4>L5 in this modification.

As illustrated in FIG. 6, the cover body 110b in the second modification has a step 112b instead of the step 112a of the cover body 110a in the first modification. The step 112b is formed smaller in height (is positioned higher) than the step 112a in the first modification. Thus, the cover body 110b has a space 113b formed around the electrolyte solution filling port 111, the space 113b smaller in height than the space 113a in the first modification. In this modification, other constituent elements represent identical or equivalent to those in the first modification, and thus a description thereof will be omitted.

With such a configuration, in the axial direction (Z-axis direction) of a shaft part 410, a distance between a tip end of the shaft part 410 and an inner face 115 of the cover body 110b (L1 in FIG. 6) is smaller than a length of a portion where the shaft part 410 abuts an inner peripheral face of the electrolyte solution filling port 111 (L6 in FIG. 6), thereby resulting in (L1<L6). Concurrently, in the axial direction (Z-axis direction) of the shaft part 410, the length of the portion where the shaft part 410 abuts the inner peripheral face of the electrolyte solution filling port 111 (L6 in FIG. 6) is greater than a length of a border between the shaft part 410 and the space 113b (L7 in FIG. 6), thereby resulting in (L6>L7). In this modification, the relationship corresponds to L6>L1>L7, but the relationship may alternatively be L6>L1=L7 or L6>L7>L1.

As has been described above, with an energy storage device according to the first modification and an energy storage device according to the second modification, each of the steps 112a and 112b is formed smaller in height (is positioned higher), and thus each of the steps 112a and 112b may be easily formed.

(Third Modification)

Figure 7:
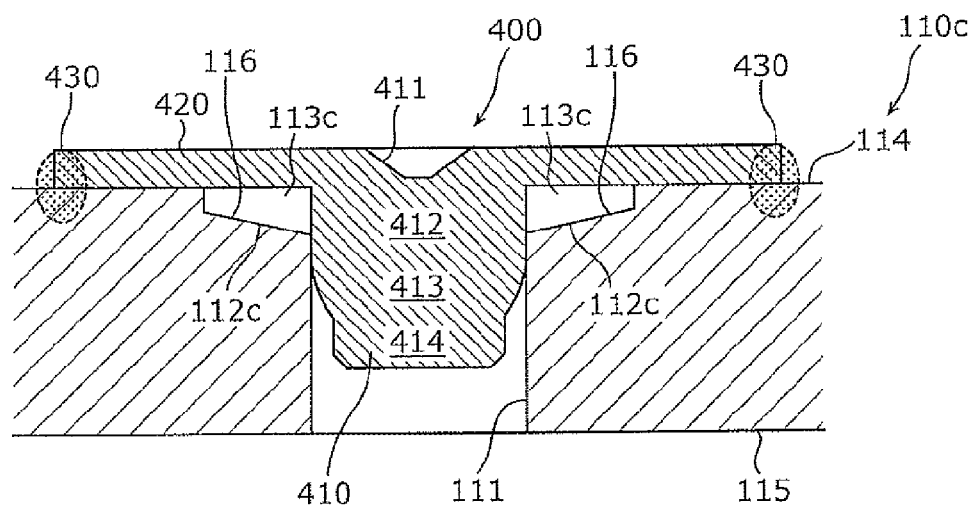
FIG. 7 is a cross-sectional view illustrating a configuration of an area around an electrolyte solution filling port of a cover body according to a third modification, and a configuration of an electrolyte solution plug according to the third modification.

Next, a third modification of the foregoing embodiment will be described. FIG. 7 is a cross-sectional view illustrating a configuration of an area around an electrolyte solution filling port 111 of a cover body 110c according to the third modification, and a configuration of an electrolyte solution plug 400 according to the third modification. Note that FIG. 7 corresponds to FIG. 4 in the foregoing embodiment.

As illustrated in FIG. 7, the cover body 110c in this modification has a step 112c instead of the step 112 of the cover body 110 in the foregoing embodiment. The step 112c has, as its bottom face, an inclined face 116 that is inclined inward of a case 100 as closer to the electrolyte solution filling port 111. Thus, the cover body 110c has a space 113c formed around the electrolyte solution filling port 111, the space 113c greater in height as closer to the electrolyte solution filling port 111. In other words, the cover body 110c has the inclined face 116 that is disposed adjacent to the space 113c and is inclined inward of the case 100 as closer to the electrolyte solution filling port 111. In this modification, other constituent elements represent identical or equivalent to those in the foregoing embodiment, and thus a description thereof will be omitted.

Note that, in this modification, the inclined face 116 is linearly inclined inward of the case 100 as closer to the electrolyte solution filling port 111, but the inclined face 116 may be a curved inclined face or may be formed in other shapes.

As has been described above, an energy storage device according to this modification provides the same effects as in the foregoing embodiment. Particularly, the cover body 110c of the case 100 has the inclined face 116 that is inclined inward of the case 100 as closer to the electrolyte solution filling port 111. In this state, the inclined face 116 suppresses electrolyte solution from flowing upward. With this configuration, the electrolyte solution is even less prone to flow up and out of the electrolyte solution filling port 111.

(Fourth Modification)

Figure 8:
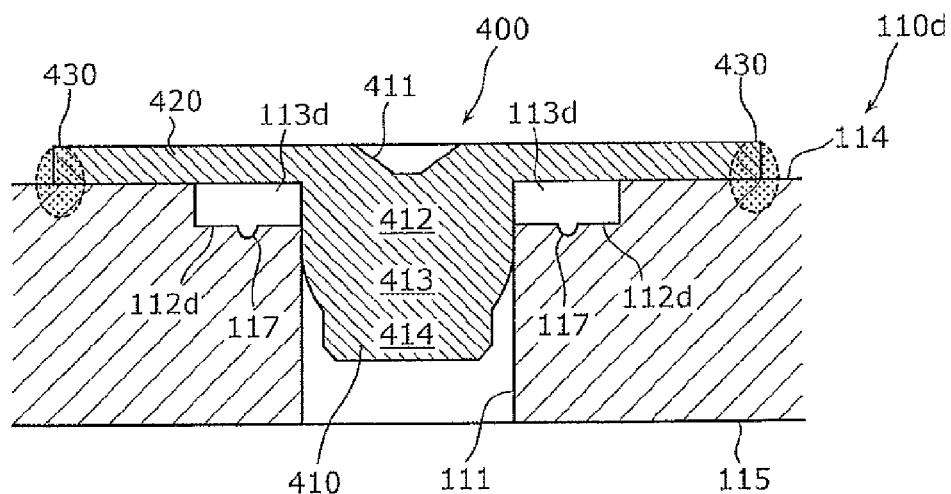
FIG. 8 is a cross-sectional view illustrating a configuration of an area around an electrolyte solution filling port of a cover body according to a fourth modification, and a configuration of an electrolyte solution plug according to the fourth modification.

Next, a fourth modification of the foregoing embodiment will be described. FIG. 8 is a cross-sectional view illustrating a configuration of an area around an electrolyte solution filling port 111 of a cover body 110d according to the fourth modification, and a configuration of an electrolyte solution plug 400 according to the fourth modification. Note that FIG. 8 corresponds to FIG. 4 in the foregoing embodiment.

As illustrated in FIG. 8, the cover body 110d in this modification has a step 112d instead of the step 112 of the cover body 110 in the foregoing embodiment. The step 112d has, on its bottom face, a concave part 117. In other words, the concave part 117 is an annular-shaped concave part in the top view and is formed on a face of the step 112d, the face opposing a projecting part 420. The cover body 110d has the concave part 117 disposed adjacent to a space 113d. In this modification, other constituent elements represent identical or equivalent to those in the foregoing embodiment, and thus a description thereof will be omitted. Note that the top view shape or a cross-sectional shape of the concave part 117 is not particularly limited, and similarly, a size of the concave part 117 is not limited.

As has been described above, an energy storage device according to this modification provides the same effects as in the foregoing embodiment. Particularly, the concave part 117 is disposed adjacent to the space 113d, causing electrolytic solution to be stored in the concave part 117, and thus, the electrolyte solution is even less prone to flow up and out of the electrolyte solution filling port 111.

(Fifth Modification)

Figure 9:
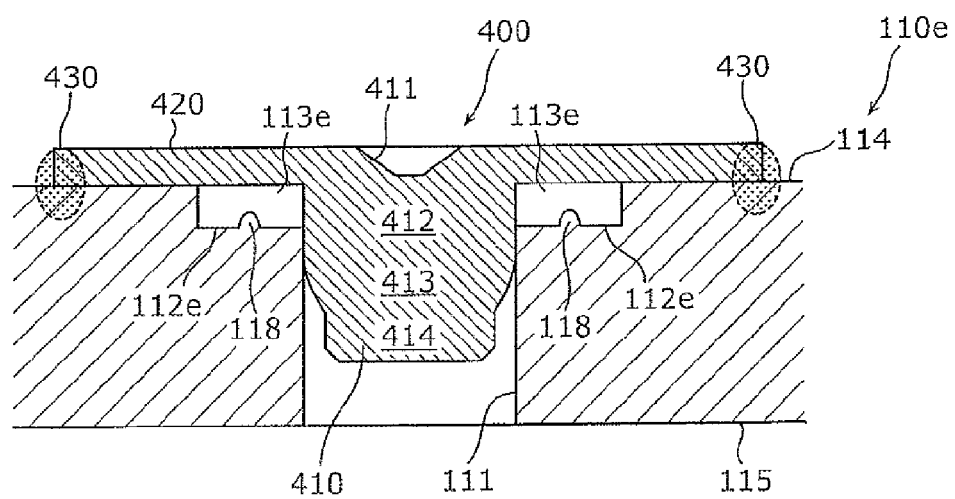
FIG. 9 is a cross-sectional view illustrating a configuration of an area around an electrolyte solution filling port of a cover body according to a fifth modification, and a configuration of an electrolyte solution plug according to the fifth modification.
Figure 9:
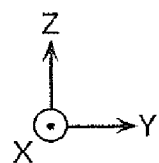

Next, a fifth modification of the foregoing embodiment will be described. FIG. 9 is a cross-sectional view illustrating a configuration of an area around an electrolyte solution filling port 111 of a cover body 110e according to the fifth modification, and a configuration of an electrolyte solution plug 400 according to the fifth modification. Note that FIG. 9 corresponds to FIG. 4 in the foregoing embodiment.

As illustrated in FIG. 9, the cover body 110e in this modification has a step 112e instead of the step 112 of the cover body 110 in the foregoing embodiment. The step 112e has, on its bottom face, a convex part 118. In other words, the convex part 118 is an annular-shaped convex part in the top view and is formed on a face of the step 112e, the face opposing the projecting part 420. The cover body 110e has the convex part 118 disposed adjacent to a space 113e. In this modification, other constituent elements represent identical or equivalent to those in the foregoing embodiment, and thus a description thereof will be omitted. Note that the top view shape or a cross-sectional shape of the convex part 118 is not particularly limited, and similarly, a size of the convex part 118 is not limited.

As has been described above, an energy storage device according to this modification provides the same effects as in the foregoing embodiment. Particularly, the convex part 118 is disposed adjacent to the space 113e, serving as a wall to suppress electrolyte solution from flowing upward, and thus, the electrolyte solution is even less prone to flow up and out of the electrolyte solution filling port 111.

The foregoing description concerns an energy storage device according to each of an embodiment of the present invention and modifications thereof, but the present invention is not limited to the foregoing embodiment and the modifications thereof. In other words, the embodiment and the modifications thereof disclosed herein are to be considered in all respects as merely illustrative and not restrictive. The scope of the present invention is defined by the appended claims rather than the foregoing description. The present invention is therefore intended to embrace all changes and modifications within the meanings and scopes equivalent to the claims.

For example, in the foregoing embodiment and the modifications thereof, the cover body of the case 100 has a single-level step formed around the electrolyte solution filling port 111. Alternatively, the cover body of the case 100 may have a two (or more) level step formed around the electrolyte solution filling port 111. Further, a shape around a step on the outer face 114 of the cover body of the case 100 is not particularly limited. For example, a concave part or a convex part may be formed around the step on the outer face 114.

As another example, in the foregoing embodiment and the modifications thereof, the bonded part 430 is the welded part formed by laser welding the projecting part 420 of the electrolyte solution plug 400 to the cover body of the case 100. However, a method of bonding the projecting part 420 to the cover body is not limited to the laser welding, and may alternatively be other types of welding, such as resistance welding or ultrasonic welding. Further, the method of bonding is not limited to welding. For example, the bonded part 430 may be formed by using adhesive or the like to adhere the projecting part 420 of the electrolyte solution plug 400 to the cover body of the case 100. The bonded part 430 may alternatively be formed by sealing (e.g., heat sealing) or mechanically bonding (e.g., caulking) the projecting part 420 of the electrolyte solution plug 400 to the cover body of the case 100. In this case too, the electrolyte solution is less prone to flow up and out of the electrolyte solution filling port 111, thereby resulting in suppression in a bonding failure between the electrolyte solution plug 400 and the cover body.

As further another example, in the foregoing embodiment and the modifications thereof, the electrolyte solution filling port 111 is formed in the cover body of the case 100, and the electrolyte solution plug 400 is disposed in the cover body of the case 100 to close the electrolyte solution filling port 111. Alternatively, the electrolyte solution filling port 111 may be formed in any one of the walls of the case body 120, and the electrolyte solution plug 400 may be disposed in the corresponding wall of the case body 120 to close the electrolyte solution filling port 111.

The respective constituent elements described in the foregoing embodiment and the modifications thereof may be combined arbitrarily as long as no conflict arises, and the present invention is intended to embrace these combinations within the meanings and scopes equivalent to the claims.

Additionally, the present invention provides not only an energy storage device but also a case 100 accommodated in the energy storage device, the case 100 including a cover body as a wall and an electrolyte solution plug 400.

INDUSTRIAL APPLICABILITY

The present invention is applicable to an energy storage device such as a lithium ion secondary battery.

DESCRIPTION OF REFERENCE SIGNS 10 energy storage device
100 case
110, 110a, 110b, 110c, 110d, 110e cover body
111 electrolyte solution filling port
113, 113a, 113b, 113c, 113d, 113e space
115 inner face
116 inclined face
117 concave part
118 convex part
400 electrolyte solution plug
410 shaft part
414 tip
420 projecting part
430 bonded part

The invention claimed is:

1. An energy storage device comprising a case, the case including:
a wall where an electrolyte solution filling port is formed; and
an electrolyte solution plug that closes the electrolyte solution filling port,
wherein
the electrolyte solution plug includes a shaft part inserted into the electrolyte solution filling port, and a projecting part that projects from a periphery of the shaft part and is bonded to the wall,
in the wall, a space adjacent to the shaft part is formed around the electrolyte solution filling port, and a tip end of the shaft part is disposed in the electrolyte solution filling port, and
in an axial direction of the shaft part, a length of a portion where the shaft part abuts an inner peripheral face of the electrolyte solution filling port is smaller than a length of a border portion between the shaft part and the space.

2. The energy storage device according to claim 1, wherein
in the axial direction of the shaft part, a distance between the tip end of the shaft part and an inner face of the wall is greater than the length of the portion where the shaft part abuts the inner peripheral face of the electrolyte solution filling port.

3. The energy storage device according to claim 1, wherein
the wall has an inclined face that is disposed adjacent to the space and is inclined inward of the case as closer to the electrolyte solution filling port.

4. The energy storage device according to claim 1, wherein
a portion of the shaft part that is adjacent to the space has a diameter equal to or smaller than a diameter of the portion of the shaft part that abuts the inner peripheral face of the electrolyte solution filling port.

5. An energy storage device comprising a case, the case including:
a wall where an electrolyte solution filling port is formed; and
an electrolyte solution plug that closes the electrolyte solution filling port,
wherein
the electrolyte solution plug includes:
a shaft part that is formed in a cylindrical shape, extends in a first direction, and is inserted into the electrolyte solution filling port; and
a projecting part that projects in a second direction orthogonal to the first direction from a periphery of the shaft part in a cross-sectional view, and is bonded to an outer face of the wall,
the shaft part and the projecting part are integrally formed by a metal member as a single piece,
in the wall, a recess that is recessed from the outer face is formed around the electrolyte solution filling port, and a space is formed between the shaft part, the projecting part, and the recess,
the shaft part includes a cylindrical portion that has an identical diameter from the projecting part to an entrance of the electrolyte solution filling port, and
in an axial direction of the shaft part, a length of a portion where the shaft part abuts an inner peripheral face of the electrolyte solution filling port is smaller than a length of a border portion between the shaft part and the space.

6. The energy storage device according to claim 1, wherein
in the axial direction of the shaft part, a distance between the tip end of the shaft part and an inner face of the wall is greater than the length of the border portion between the shaft part and the space.

7. The energy storage device according to claim 1, wherein
in the axial direction of the shaft part, the length of the border portion between the shaft part and the space is greater than a distance between the tip end of the shaft part and an inner face of the wall.

8. The energy storage device according to claim 1, wherein in the axial direction of the shaft part, a distance between the tip end of the shaft part and an inner face of the wall is equal to the length of the border portion between the shaft part and the space.

9. The energy storage device according to claim 1, wherein
in the axial direction of the shaft part, a distance between the tip end of the shaft part and an inner face of the wall is greater than or equal to the length of the border portion between the shaft part and the space.

10. The energy storage device according to claim 1, wherein
in the axial direction of the shaft part, the length of the border portion between the shaft part and the space is greater than or equal to a distance between the tip end of the shaft part and an inner face of the wall.

11. The energy storage device according to claim 1, wherein
in the axial direction of the shaft part, the length of the border portion between the shaft part and the space is greater than a distance between the tip end of the shaft part and an inner face of the wall, and
in the axial direction of the shaft part, the distance between the tip end of the shaft part and the inner face of the wall is greater than the length of the portion where the shaft part abuts the inner peripheral face of the electrolyte solution filling port.

12. The energy storage device according to claim 5, wherein
in the axial direction of the shaft part, a distance between a tip end of the shaft part and an inner face of the wall is greater than the length of the portion where the shaft part abuts the inner peripheral face of the electrolyte solution filling port.

13. The energy storage device according to claim 5, wherein
in the axial direction of the shaft part, a distance between a tip end of the shaft part and an inner face of the wall is greater than the length of the border portion between the shaft part and the space.

14. The energy storage device according to claim 5, wherein
in the axial direction of the shaft part, the length of the border portion between the shaft part and the space is greater than a distance between a tip end of the shaft part and an inner face of the wall.

15. The energy storage device according to claim 5, wherein
in the axial direction of the shaft part, a distance between a tip end of the shaft part and an inner face of the wall is equal to the length of the border portion between the shaft part and the space.

16. The energy storage device according to claim 5, wherein
in the axial direction of the shaft part, a distance between a tip end of the shaft part and an inner face of the wall is greater than or equal to the length of the border portion between the shaft part and the space.

17. The energy storage device according to claim 5, wherein
in the axial direction of the shaft part, the length of the border portion between the shaft part and the space is greater than or equal to a distance between a tip end of the shaft part and an inner face of the wall.

18. The energy storage device according to claim 5, wherein
in the axial direction of the shaft part, the length of the border portion between the shaft part and the space is greater than a distance between a tip end of the shaft part and an inner face of the wall, and
in the axial direction of the shaft part, a distance between the tip end of the shaft part and the inner face of the wall is greater than the length of the portion where the shaft part abuts the inner peripheral face of the electrolyte solution filling port.

19. The energy storage device according to claim 5, wherein
in the axial direction of the shaft part, the length of the border portion between the shaft part and the space is greater than or equal to a distance between a tip end of the shaft part and an inner face of the wall, and
in the axial direction of the shaft part, a distance between the tip end of the shaft part and the inner face of the wall is greater than the length of the portion where the shaft part abuts the inner peripheral face of the electrolyte solution filling port.

* * * * *